Patented Sept. 28, 1943

2,330,223

UNITED STATES PATENT OFFICE 2,330,223

AMINOTHIAZOLE FROM CHLOROACETAL

Lucas P. Kyrides, Webster Groves, Mo., assignor to Monsanto Chemical Company, St. Louis, Mo., a corporation of Delaware No Drawing. Application October 29, 1940.
Serial No. 363,299

10 Claims. (Cl. 260—302)

The present invention relates to the production of 2-aminothiazole and alkyl and aryl-substituted aminothiazoles and relates particularly to the production of said compounds by the reaction of chloroacetal (chloroacetaldehyde diethyl acetal, $CH_2Cl—CH—(OC_2H_5)_2$) or substituted chloroacetals with thiourea.

The object of the invention is to provide a new and convenient method of making 2-aminothiazole and alkyl and aryl-substituted aminothiazoles. Other objects and advantages of my invention, some of which are specifically pointed out hereinafter, will be obvious from the following description.

2-aminothiazole, $C_3H_4N_2S$, which is also known as omega-aminothiazole and thiazolone-(2)-imide, has the formula indicated as I, which may be abbreviated as indicated in II hereinbelow:

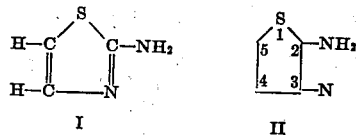

The compound is a valuable intermediate for the introduction of the thiazole group into numerous compounds, and especially for the production of sulfathiazole (p-aminobenzene-sulfamidothiazole or 2-sulfanilamidothiazole,

$NH_2—C_6H_4—SO_2NH—C_3H_2NS$)

I have discovered that 2-aminothiazole and its alkyl and aryl-substituted derivatives can be produced by reacting thiourea in the presence of water with chloroacetal or substituted chloroacetals or with crude reaction mixtures containing such chloroacetals. The reaction for the preparation of 2-aminothiazole can be written as:

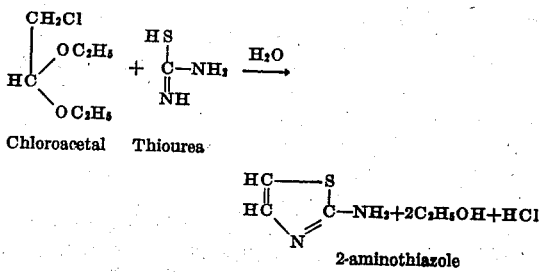

The reaction with chloroacetal is easily controlled and the yields are high.

Chloroacetal may be made in a number of ways but I have found vinyl acetate or similar vinyl esters of organic acids to be convenient raw materials for this purpose. By chlorinating vinyl acetate with or without ethyl alcohol at low temperatures (at about —30° C. or higher) and thereafter adding ethyl alcohol, if none was present during the chlorination, and allowing the reaction mixture to warm up to room temperature (about 20° C.) excellent yields of chloroacetal can be obtained. Such a general method of preparation is described by Edward M. Filachione in the Journal of the American Chemical Society 1939, vol. 61, pages 1705–6. It is not necessary to use absolute ethyl alcohol in the preparation of chloroacetal as therein described since 95% alcohol and alcohol containing greater amounts of water give satisfactory yields of product which may be used for the production of 2-aminothiazole; nor is it essential that the alcohol be present until after the vinyl acetate has been chlorinated. It is not necessary to isolate the pure chloroacetal and I prefer to use the crude mixture resulting from the chlorination of vinyl acetate in ethyl alcohol as a starting material for the production of 2-aminothiazole. Esters of organic acids and vinyl alcohols such as vinyl propionate, vinyl butyrate and vinyl hexoate may be used in place of vinyl acetate and the vinyl group of such compounds may be substituted with alkyl or aryl groups to yield alkyl- or aryl-substituted haloacetals.

When vinyl acetate is chlorinated in the absence of alcohol the predominant product is 1,2-dichloroethyl acetate

$(CH_2Cl—CH(Cl)—OOC—CH_3)$

I have reacted this compound with thiourea in water and found that, in comparison with the similar reaction of chloroacetal

$(CH_2Cl—CH(OC_2H_5)_2)$ the reaction is much more violent and difficult to control and the desired 2-aminothiazole is not as easily obtained in high yields. Crude 1,2-dichloroethyl acetate always contains free hydrogen chloride and acetyl chloride and, furthermore, is an unstable compound, having a tendency to dissociate into chloroacetaldehyde and acetyl chloride.

In producing 2-aminothiazole by my method substantially pure chloroacetal or a crude reaction mixture resulting from the chlorination of vinyl acetate in an alcohol or a crude reaction mixture resulting from reacting an alcohol with chlorinated vinyl acetate is used. Absolute (100%) or ethyl alcohol (95%) yield the diethyl chloroacetal but methyl, propyl, butyl and amyl alcohols may be used to form corresponding homologous chloroacetals. The chlorination may be conducted at reduced temperatures before any alcohol is added to the reaction mixture and, after the requisite amount of chlorine has been combined, thereafter may be added at least two molecular equivalents of alcohol and the mixture may be allowed to warm up slowly to room temperature. However, I have found that the chlorination may be conducted at or about room temperature in the presence of alcohol. The reactions involved in either method of operation appear to be:

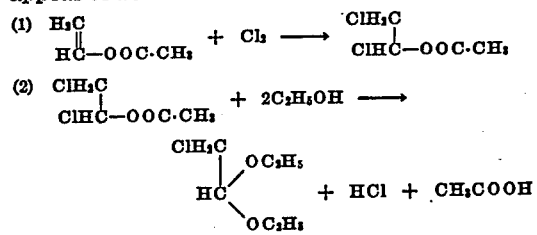

When the chlorination is conducted at room temperature both reactions probably occur at the same time and the exit gases leaving the reaction mixture contain hydrogen chloride. In controlling the chlorination at room temperature therefore, I add the chlorine at such a rate that the exit gases contain substantially no free chlorine and measure the input of chlorine by weight added to the reaction mixture, which I believe to be somewhat more accurate than weighing the reaction mixture since the extent to which Reaction 2 hereinabove has proceeded is not readily determinable. When chlorinating in the absence of alcohol I prefer to control the reaction in such a manner that the requisite amount of chlorine is entirely absorbed and that no free chlorine or hydrogen chloride escapes from the reaction mixture during chlorination, hence the amount of chlorine absorbed can be determined from the weight of the reaction mixture before the second stage of the reaction, addition of alcohol, is started.

The reaction to form chloroacetal requires two molecules of ethyl alcohol for each molecule of vinyl acetate. I prefer to use double this amount (4 molecules) of alcohol or a greater quantity, whether the chlorination is conducted in the presence of alcohol or the alcohol is subsequently added after the chlorination to complete the formation of chloroacetal. In the foregoing reaction actually 3 mols of ethyl alcohol will be consumed in making chloroacetal since 1 mol is consumed in the esterification of acetic acid to ethyl acetate, hence the excess of ethyl alcohol, when 4 mols are used in the reaction, is 1 mol.

Another advantage of my process of using chloroacetal instead of 1,2-dichloroethyl acetate or crude chlorination mixtures containing such products is the ease of reaction. 1,2-dichloroethyl acetate reacts violently with thiourea in water. It is a difficult reaction to control and hence when not controlled results in low yields of a product which is contaminated with substantial quantities of impurities. On the other hand, chloroacetal reacts smoothly and the reaction is easy to control. When 1,2-dichloroethyl acetate reacts with thiourea and water to form 2-aminothiazole, twice as much hydrogen chloride (or acetyl chloride) is liberated in the reaction as is liberated in the reaction of chloroacetal, as is evident from the equations for the two reactions.

The equation for the reaction of 1,2-dichloroethyl acetate is as follows (that of chloroacetal was shown hereinabove):

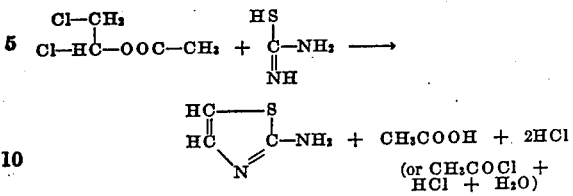

The reaction of a haloacetal with thiourea may be expressed by the general equation:

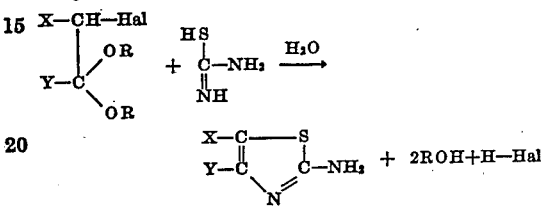

in which Hal is a halogen atom, X and Y represent hydrogen, alkyl or aryl radicals and R is a lower alkyl radical of not more than about five carbon atoms, preferably, although it may be an alkyl radical of a greater number of carbon atoms.

In conducting the reaction between thiourea and the haloacetal or a crude reaction mixture containing a haloacetal, the reactants in stoichiometric quantities may be brought together in water and reacted by heating under reflux. The reaction proceeds more advantageously in the presence of water although it is not required by the equation. Preferably, however, the haloacetal is added slowly to a warm solution of thiourea and the reaction continued under reflux. An excess of thiourea is preferably maintained in the reaction mixture to drive the reaction to completion.

The examples which follow are directed specifically to the preparation of 2-aminothiazole according to the preferred processes of my invention but it is to be understood that these are merely illustrative methods of applying my invention and that the principles herein disclosed are applicable to the preparation of alkyl or aryl-substituted 2-aminothiazoles from haloacetals in general.

EXAMPLE 1

Into a mixture of 25 cc. of water, 65 grams (0.855 mol) of thiourea and 50 cc. (about 0.83 mol) of ethyl alcohol (95%) contained in a flask connected with a reflux condenser and provided with a stirrer is dropped in small portions, over the course of one hour, 125 grams (0.82 mol) of distilled chloroacetal prepared by the method of E. M. Filachione, J. Am. Chem. Soc., 1939, vol. 61, page 1706. The reaction is allowed to proceed for several hours while heating under reflux. After refluxing, the mixture is allowed to cool to about 70° to 75° C. and sodium carbonate is added in small portions (47 grams or less may be required to achieve neutrality) while stirring. While the mixture is still warm it is filtered from undissolved salts and the residue on the filter is washed with warm alcohol.

The 2-aminothiazole may be recovered as hereinafter indicated or in the following manner. The filtrate obtained above is concentrated by evaporation and then treated with a few pellets of sodium hydroxide and fractionated in vacuum using a hot condenser to prevent clogging by crystals. In this manner 75.6 grams of nearly colorless 2-aminothiazole having a crystallizing point of 88.5° C. and a boiling point of 118° to 120° C. at a pressure of 20 mm. of mercury can be obtained. The melting point of 2-aminothiazole is generally given as 90° C. although other investigators have reported melting points as high as 92° C. The yield is approximately 92% of the theoretical obtainable from the chloroacetal.

EXAMPLE 2

One hundred eighty-five (185) grams (about 3.82 mols) of 95% ethyl alcohol were heated to 55° C. and to it was added, with stirring, one mol (about 157 grams) of crude 1,2-dichloro-ethyl acetate, maintaining the temperature at about 55°. Then the mixture was cooled to room temperature.

Seventy-five (75) grams (0.985 mol) of thiourea, 25 cc. of water and 25 cc. (about 0.41 mol) of alcohol were heated with stirring to 70°. The crude alcoholic solution of diethyl chloroacetal was added slowly at 70° and the mixture was heated at 70–75° for 4 hours. A solution of aminothiazole hydrochloride was obtained from which the aminothiazole base was liberated by conventional procedure and distilled at about 5 mm. pressure. The yield was 83.6% of practically colorless 2-aminothiazole.

EXAMPLE 3

One mol (86 grams) of vinyl acetate was dissolved in 185 g. (about 3.82 mols) of ethyl alcohol and the mixture was cooled to −10° C. Chlorine was introduced with stirring at such a rate that the temperature of the reaction mixture was mainained beween −5 and −10° C. and that the chlorine was absorbed completely. When the calculated weight of chlorine had been introduced the mixture was permitted to warm to room temperature when it was ready for reaction with thiourea.

Seventy-five (75) grams (0.985 mol) of thiourea, 25 cc. of water and 25 cc. (about 0.41 mol) of alcohol were heated with stirring to 70°. The crude alcoholic mixture of diethyl chloroacetal was added slowly at 70° and the reaction mixture was heated at 70–75° for 4 hours. The aminothiazole base was liberated from the solution of its hydrochloride by conventional procedure and then purified by distillation under a pressure of about 5 mm. of mercury.

PURIFICATION OF 2-AMINOTHIAZOLE 2-aminothiazole, regardless of how prepared, is a difficult substance to purify since it probably exists in two or more tautomeric forms and is heat labile and undergoes pyrogenetic decomposition when heated to about 150° C., which is below its boiling point at all pressures above about 50 mm. of mercury. Tarry products result when decomposition has occurred. Melting or crystallizing point and color of the melted sample are good criteria of purity of the sample.

In the following examples of methods of purification, a crude sample containing about 85% to 95% of 2-aminothiazole was used to determine the efficiency of the various methods.

1. Benzene extraction

Twenty (20) grams of the crude aminothiazole were dissolved in 75 cc. of benzene and boiled. Some tarry material remained undissolved. Fifteen (15) cc. of Skellysolve E (petroleum hydrocarbon fraction) were added and the mixture was filtered while hot and the filtrate was then allowed to cool and the aminothiazole allowed to crystallize therefrom. The recovery of crystals was 51%. The melt was black and the crystallizing point was 85.2° C.

2. Extraction with carbon tetrachloride

Twenty (20) grams of crude aminothiazole were refluxed with 50 cc. of carbon tetrachloride and the solution was filtered. The recovery was 38% of 2-aminothiazole although more could probably be recovered from the residue by further extraction. The product had a crystallizing point of 87.4° C. and its melt was brown.

3. Extraction with water and distillation

Fifty (50) grams of crude aminothiazole were heated to 55° C. with 250 cc. of water. The tar was filtered off and the product was distilled in a vacuum of 5 mm. of mercury (boiling point about 94° at this pressure). Tarring occurred during distillation. The recovery was 72% of a product having a crystallizing point of about 88.6° C. and a pale straw melt.

4. Salting out from water

Crude aminothiazole hydrochloride was neutralized with a stoichiometric quantity of sodium hydroxide in an amount of water just sufficient to dissolve the sodium chloride which would be produced. The 2-aminothiazole which was thereby salted out was filtered off and dried by suction. The product assayed 84.5% aminothiazole, which is unsatisfactory, and the recovery was 71.2%.

5. Steam distillation

The crude aminothiazole was treated with steam. Tarring occurred making the process difficult to conduct. The product was a 2 to 3% aqueous solution of aminothiazole, which was obtained in a 60 to 65% yield.

6. Distillation with superheated steam

The crude aminothiazole was steamed with superheated steam at 115 to 120° C. Extensive tarring occurred in the still. The product was an aqueous solution of aminothiazole which was obtained in a yield of about 65%.

7. Batch distillation in vacuum

Small laboratory batches (100 grams or thereabout) of the crude aminothiazole yield on batch distillation in vacuum of about 5 mm. of mercury a recovery of 75 to 85% aminothiazole. Large batches which require a distillation period of 10 hours or more, yield only 35 to 50% of 2-aminothiazole.

The foregoing and various other methods which were tried did not provide adequate recovery of a product which was satisfactory in purity. Each alternative tried failed to have substantial effect. It was then discovered that 2-aminothiazole could be satisfactorily recovered in a state of high purity without substantial decomposition or contamination with decomposition products by the use of a flash distillation. This process consists in dropping substantially dry crude aminothiazole preferably free from inorganic salts into a still heated at a temperature about 20 to 30° C. above the boiling point of aminothiazole at the particular pressure maintained in the still at such a rate that distillation is nearly instantaneous or at such a rate that no substantial decomposition can occur while the aminothiazole is being subjected to distillation. The still may be filled with solid contact masses to accelerate the distillation or with porous solids so that the undistilled products may be held. By operating the distillation in such a manner yields of 75 to 80% of product of a high degree of purity may be obtained from crudes which have a content of approximately 85% to 95% aminothiazole. Yield on second flash distillation is even higher, corresponding to approximately 95% or higher of product submitted to distillation. An example of a procedure for conducting the distillation follows:

EXAMPLE 4

For the distillation a tube still is used which consists of a vertical jacketed tube heated with steam to 125° C., the lower end of which is provided with a catch-pot or receiver for the tarry material, and a downward condenser leading to the product receiver is provided at the top of the still. The condenser is cooled with hot water to about 89.5°–90° C., just above the crystallizing point of distilled aminothiazole. The product receiver, connected with the condenser, is cooled in a bath of cold water. The entire distilling system is evacuated to a pressure of 5 mm. of mercury and the melted, crude aminothiazole is fed into the top of the tube still at a rate which permits complete stripping of the aminothiazole from the high-boiling tars in the time required for the tar to flow the full length of the tube. After the last portion of crude to be distilled is added, conditions on the apparatus are maintained as before during about 1 hour to ensure completeness of stripping, after which the still is shut down and the distilled aminothiazole is discharged from the receiver. The refined material is light brown to yellow in color and has a crystallizing point of about 89.0° C. Yields amount to about 72 to 74% calculated on the crude aminothiazole charged.

The flash distillation process is similarly applicable to alkyl and aryl-substituted aminothiazoles.

Inasmuch as the foregoing comprise preferred embodiments of my invention it is to be understood that the invention is not limited thereto and that variations and modifications may be made therein to adapt the invention to other uses in accordance with the principles herein set forth without departing substantially from the invention, which is limited solely by the appended claims.

I claim:

1. The method of producing a 2-aminothiazole which comprises reacting thiourea with a haloacetal in the presence of water and a lower aliphatic alcohol.

2. The method of producing a 2-aminothiazole which comprises reacting thiourea in the presence of water and a lower aliphatic alcohol with a haloacetal of the general formula

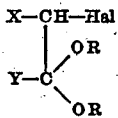

in which Hal represents a halogen atom, X and Y are selected from the group consisting of hydrogen, alkyl and aryl radicals and R is an alkyl radical.

3. The method of producing a 2-aminothiazole which comprises halogenating an organic acid ester of a vinyl alcohol until approximately two atomic proportions of halogen have been absorbed, reacting at least four molecular proportions of a lower aliphatic alcohol with the halogenated product to form a haloacetal, reacting the crude mixture containing the haloacetal and alcohol with thiourea in the presence of water, and thereafter separating the 2-aminothiazole from the reaction mixture.

4. The method of producing 2-aminothiazole which comprises reacting thiourea with chloroacetal in the presence of water and ethyl alcohol.

5. The method of producing 2-aminothiazole which comprises chlorinating vinyl acetate until approximately two atomic proportions of chlorine have been absorbed, reacting at least four molecular proportions of a lower aliphatic alcohol with the chlorinated product to form a chloroacetal, reacting this crude mixture containing the chloroacetal and alcohol with thiourea in the presence of water, and thereafter separating 2-aminothiazole from the reaction mixture.

6. The method of producing 2-aminothiazole which comprises chlorinating vinyl acetate until approximately two atomic proportions of chlorine have been absorbed, reacting at least four molecular proportions of a lower aliphatic alcohol with the chlorinated product to form a chloroacetal, reacting this crude mixture containing the chloroacetal and alcohol with thiourea in the presence of water, separating 2-aminothiazole from the reaction mixture and drying it, and thereafter subjecting said substantially dry 2-aminothiazole to flash distillation.

7. The method of producing a 2-aminothiazole which comprises heating thiourea with a haloacetal in the presence of water and a lower aliphatic alcohol.

8. The method of purifying crude 2-aminothiazole which comprises bringing the crude 2-aminothiazole in contact with a heated surface of a distillation apparatus maintained under a vacuum of less than approximately 5 mm. of mercury, which surface is maintained at a temperature above the boiling point of the pure 2-aminothiazole at the particular pressure but below approximately 125° C., at such a rate that instantaneous vaporization without appreciable decomposition of the 2-aminothiazole takes place and thereafter condensing the vaporized 2-aminothiazole in another part of the apparatus.

9. The method of producing 2-aminothiazole which comprises reacting thiourea with chloroacetal and at least an equimolecular quantity of ethyl alcohol in the presence of water.

10. The method of purifying a crude 2-aminothiazole which comprises bringing the crude 2-aminothiazole in contact with a heated surface, which surface is maintained substantially constantly at a temperature above the boiling point of the pure 2-aminothiazole under the particular pressure conditions prevailing, at such a rate that substantially instantaneous vaporization without appreciable decomposition of the 2-aminothiazole takes place and thereafter condensing the vaporized 2-aminothiazole.

LUCAS P. KYRIDES.